United States Patent
Xu

(10) Patent No.: US 9,141,251 B2
(45) Date of Patent: Sep. 22, 2015

(54) TECHNIQUES FOR GUIDED ACCESS TO AN EXTERNAL DISTRIBUTED FILE SYSTEM FROM A DATABASE MANAGEMENT SYSTEM

(75) Inventor: Yu Xu, Burlingame, CA (US)

(73) Assignee: Teradata US, Inc., Dayton, OH (US)

( * ) Notice: Subject to any disclaimer, the term of this patent is extended or adjusted under 35 U.S.C. 154(b) by 470 days.

(21) Appl. No.: 13/340,346

(22) Filed: Dec. 29, 2011

(65) Prior Publication Data
US 2013/0174048 A1   Jul. 4, 2013

(51) Int. Cl.
G06F 17/30     (2006.01)
G06F 3/048     (2013.01)
G06F 15/16     (2006.01)

(52) U.S. Cl.
CPC .......... *G06F 3/048* (2013.01); *G06F 15/16* (2013.01); *G06F 17/30103* (2013.01); *G06F 17/30194* (2013.01); *G06F 17/30557* (2013.01)

(58) Field of Classification Search
CPC ............... G06F 17/30067; G06F 17/30282; G06F 17/30091; G06F 17/3061; G06F 17/30017; G06F 17/30286
USPC ................................. 707/803, 804, 810, 805
See application file for complete search history.

(56) References Cited

U.S. PATENT DOCUMENTS

| | | | |
|---|---|---|---|
| 6,738,782 B2 * | 5/2004 | Agarwal et al. ...................... | 1/1 |
| 8,082,273 B2 * | 12/2011 | Brown et al. ................. | 707/782 |
| 8,543,596 B1 * | 9/2013 | Kostamaa et al. ............ | 707/770 |
| 2009/0132536 A1 * | 5/2009 | Brown et al. ..................... | 707/9 |
| 2011/0161321 A1 | 6/2011 | de Castro Alves et al. | |
| 2011/0161328 A1 | 6/2011 | Park et al. | |
| 2011/0161352 A1 | 6/2011 | de Castro Alves et al. | |
| 2011/0161356 A1 | 6/2011 | de Castro Alves et al. | |
| 2011/0196891 A1 | 8/2011 | de Castro Alves et al. | |
| 2011/0302583 A1 * | 12/2011 | Abadi et al. .................. | 718/102 |

OTHER PUBLICATIONS

Oracle White Paper: "Leveraging Massive Parallel Processing in na Oracle Environment for Big Data Analytic", Nov. 2010.*
IBM: "Application Devloper's Guide", version 8.2, copyright 2004.*
IBM: "IBM Cognos Business Intelligence Series 7", version 7.7. Copyright IBM Corp. 1991, 2010.*
Oracle: "Oracle Application Users Guide", Jan. 2000.*
"Oracle Fusion Middleware Getting Started with Oracle Data Integrator", Release 11g, Sep. 2010.*
Shvachko et al ("The Hadoop Distributed File System", 2010 IEEE).*
IBM, Application Developers Guide, Copyright IBM Corporation 2003, 2004., version 8.2, 286 pages.*
IBM, How to Create User-Defined Functions, Copyright IBM 1991, 2011, version 7.5, 46 pages.*

(Continued)

*Primary Examiner* — Rehana Perveen
*Assistant Examiner* — Loc Tran
(74) *Attorney, Agent, or Firm* — Schwegman Lundberg & Woessner, P.A.

(57) ABSTRACT

Techniques for guided access to an external distributed file system (DFS) from a database management system (DBMS) are provided. A user access a graphical user interface (GUI) to interactively define a search on an external DFS. The search and any filtering conditions are processed on the external DFS and results are imported to the DBMS and mapped to a table in the DBMS for manipulation and access by the user within the DBMS.

15 Claims, 3 Drawing Sheets

(56) References Cited

OTHER PUBLICATIONS

Oracle, Oracle Application User's Guide, Jan. 2000, Release 11 i, 190 pages.*

Oracle, Leveraging Massively Parallel Processing in an Oracle Environment for Big Data Analytic, Nov. 2010, 8 pages.*

Oracle, Orcal Fusion Middleware Getting Started with Oracle Data Integrator, Sep. 2012, Release 11g, 72 pages.*

Shvachko et al, the Hadoop Distributed File System, 2010, IEEE, 9 pages.*

IBM, "Application Developers Guide", Copyright International Business Corporation 2003, 2004. 288 pages.*

"Extensibility—Hadoop DFS to Teradata", [online]. [retrieved Dec. 27, 2011]. Retrieved from the Internet: <URL: http://developer.teradata.com/extensibility/articles/hadoop-dfs-to-teradata>, (Oct. 19, 2009), 8 pgs.

"HDFS Users Guide", (c) 2010 The Apache Software Foundation, (2010), 10 pgs.

* cited by examiner

US 9,141,251 B2

TECHNIQUES FOR GUIDED ACCESS TO AN EXTERNAL DISTRIBUTED FILE SYSTEM FROM A DATABASE MANAGEMENT SYSTEM

BACKGROUND

After over two-decades of electronic data automation and the improved ability for capturing data from a variety of communication channels and media, even small enterprises find that the enterprise is processing terabytes of data with regularity. Moreover, mining, analysis, and processing of that data have become extremely complex. The average consumer expects electronic transactions to occur flawlessly and with near instant speed. The enterprise that cannot meet expectations of the consumer is quickly out of business in today's highly competitive environment.

Consumers have a plethora of choices for nearly every product and service, and enterprises can be created and up-and-running in the industry in mere days. The competition and the expectations are breathtaking from what existed just a few short years ago.

The industry infrastructure and applications have generally answered the call providing virtualized data centers that give an enterprise an ever-present data center to run and process the enterprise's data. Applications and hardware to support an enterprise can be outsourced and available to the enterprise twenty-four hours a day, seven days a week, and three hundred sixty-five days a year.

As a result, the most important asset of the enterprise has become its data. That is, information gathered about the enterprise's customers, competitors, products, services, financials, business processes, business assets, personnel, service providers, transactions, and the like.

Updating, mining, analyzing, reporting, and accessing the enterprise information can still become problematic because of the sheer volume of this information and because often the information is dispersed over a variety of different file systems, databases, and applications.

In response, the industry has recently embraced a data platform referred to as Apache Hadoop™ (Hadoop™). Hadoop™ is an Open Source software architecture that supports data-intensive distributed applications. It enables applications to work with thousands of network nodes and petabytes (1000 terabytes) of data. Hadoop™ provides interoperability between disparate file systems, fault tolerance, and High Availability (HA) for data processing. The architecture is modular and expandable with the whole database development community supporting, enhancing, and dynamically growing the platform.

However, because of Hadoop's™ success in the industry, enterprises now have or depend on a large volume of their data, which is stored external to their core in-house database management system (DBMS). This data can be in a variety of formats and types, such as: web logs; call details with customers; sensor data, Radio Frequency Identification (RFID) data; historical data maintained for government or industry compliance reasons; and the like. Enterprises have embraced Hadoop™ for data types such as the above referenced because Hadoop™ is scalable, cost efficient, and reliable.

One challenge in integrating Hadoop™ architecture with an enterprise DBMS is selectively acquiring data from Hadoop™ and importing and using that data within the enterprise DBMS.

Recently, a table-based User-Defined Function (UDF) approach was introduced to allow DBMS users to have direct access to Hadoop™ files in Structured Query Language (SQL) queries. The basic idea is that a customized table UDF pulls data from the Hadoop™ distributed file system (HDFS) into the enterprise data warehouse for manipulation. Each table UDF instance runs on a particular Access Module Processor of the parallel DBMS and is responsible for retrieving a portion of the HDFS file defined in the table UDF.

However, there are a few problems with this approach, such as the three problems listed below.

Firstly, the access code to HDFS is hard-coded in the table UDF and the mapping from HDFS files to the DBMS relational data is also hard-coded. This means that if a user needs to access different columns in the same HDFS file or convert the same columns in the HDFS file to different types, a different Table UDF has to be programmed and used. This approach is not productive when the users frequently need to access different HDFS files or need access to the same HDFS file in different ways.

Secondly, although data filtering and transformation can be done by the UDF as the rows are delivered by the UDF to the SQL processing, the HDFS files are first transferred to the parallel DBMS even when later during processing on the DBS some data in the imported file are to be discarded. This can be an unfortunate waste of network bandwidth.

Thirdly, users have to develop and write the customized UDFs, which require knowledge of the Hadoop™ system and its file system's Application Programming Interface (API), and the users also need knowledge of the DMBS's table UDF infrastructure.

SUMMARY

In various embodiments, techniques for guided access to an external distributed file system (DFS) from a DBMS are presented. According to an embodiment, a method for customized access to an external DFS from a DBMS is provided.

Specifically, a graphical user interface (GUI) within a parallel database management system (DBMS) is presented to a user. The GUI is then used to interact with the user, who identifies, via the GUI, a file from an external distributed file system (DFS), external to the DBMS. Next, first columns to select from the file are acquired from the user, via the GUI, along with a mapping of the first columns to data types present in the DBMS. Then, filtering conditions for matching data in the first columns of the file are obtained from the user, via the GUI interaction. Finally, a user-defined function (UDF) is generated for selections of the user made via the GUI.

DETAILED DESCRIPTION

Figure 1:
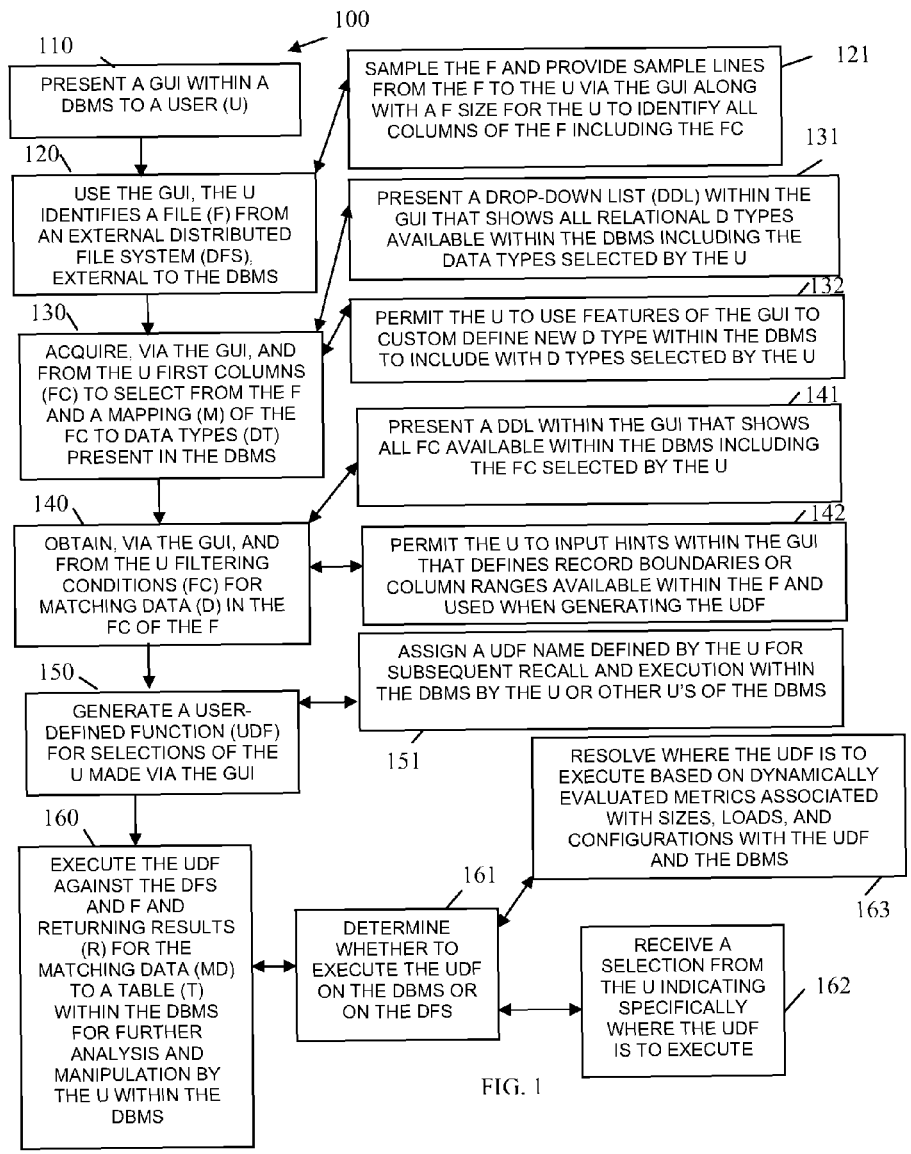
FIG. 1 is a diagram of a method for accessing an external distributed file system file via direction from a parallel DBMS, according to an example embodiment.

Initially for purposes of illustration and comprehension some context and examples are presented to highlight and illustrate the techniques being presented herein and below.

The techniques herein propose a Graphical User Interface (GUI) guided and interactive approach to help database users with direct and parallel access to Hadoop™ files (any external distributed file system (DFS) files) in their SQL queries via an automated system-generated table UDF. The GUI guided approach presented herein and below solves all the aforementioned problems.

Initially, a GUI is presented to the user within the user's DBMS, this provides processing as follows:

Step 1: the system asks the user which Hadoop™ (or any DFS) file to be operated upon and that is to be transferred to the user's DBMS;

Step 2: the system automatically samples the file, presents a few lines to the user, shows the size of the file, and asks what columns the user is interested in;

Step 3: the user picks a few columns, and for each column the system automatically suggests a few relational data types to which the data is to be converted to; also, a drop-down list is provided so that the user can pick from a complete list of relational data types; and the user can provide data transformation expressions to transform the data values in the DFS file;

Step 4: the system asks which filtering conditions are to be applied so that only certain rows matching the conditions are actually transferred to the DBMS;

Step 5: optionally, the user can provide hints to the system on the desired record boundary so that the system can produce efficient code; hints can be fixed row-width or special record delimiter; and Step 6: the user can provide a UDF name for the UDF to be generated by the system automatically; or, the system can pick up a default unique UDF name for the user.

Implementation Techniques

Once the GUI system gets all input from the above steps from the user, the system translates the input parameters to a script in a given UDF description language. The UDF description language can be in eXtensible Markup Language (XML) format or in any line delimited syntax. Then, a compiler reads the generated script and automatically generates the table customized UDF and installs it for access and processing within the DBMS.

The above-identified steps solve the two problems described above (Problems 1 and 3). That is, the user does not need to write his/her own table UDF with the approaches presented herein and it does not need to write a new table UDF for a different data loading job. However, for problem 2 above and when users provide filtering conditions and are not interested in all data in a DFS file to be transferred to the DBMS, other considerations are taken.

In order to reduce unnecessary network data transfer, the techniques presented herein can automatically generate code to be run at the Hadoop™ or external DFS side, which applies user specified filtering conditions and then only sends qualified data back to the DBMS. Data transformation can be performed at the DFS side instead of by the AMPs at the DBMS side. The system can take into account the size of the DFS system and the size of the DBMS system; estimate which system is likely to perform the transformation more quickly and then choose the right system to perform data transformation. Users can optionally give hints or require that a particular system to be used for data transformation. At runtime, when a user invokes an SQL query using the system generated table UDF to access DFS files, the DBMS Table UDF first connects to the DFS system, starts up the client side code, which then will read DFS data, performs data filtering, and sends only qualified data to the table UDF running instances on the DBS AMPs.

Notice that some applications may prefer to directly generate scripts in the DBMS UDF description language to automatically generate Table UDFs for access to DFS data, and not go through the step-by-step GUI approach. This can be useful in command-line tools and extract-transfer and load (ETL) integration scenarios. Notice also that the three problems identified above are also solved in this particular use case.

The approaches herein assist users in automatically generating Table UDFs to directly access external DFS data from SQL queries without the need to learn the external DFS or the DBMS UDF infrastructure and without the need for writing any developer code.

It is within this context that various embodiments are now discussed with reference to the FIGS. 1-3.

FIG. 1 is a diagram of a method 100 for accessing an external distributed file system (DFS) file via direction from a parallel DBMS, according to an example embodiment. The method 100 (hereinafter "data integrator") is implemented as instructions within a non-transitory computer-readable storage medium that execute on one or more processors, the processors specifically configured to execute the data integrator. Moreover, the data integrator is programmed within a non-transitory computer-readable storage medium. The data integrator is also operational over a network; the network is wired, wireless, or a combination of wired and wireless.

At 110, the data integrator presents a GUI to a user within the DBMS. The GUI is provided as part of the DBMS via an enhancement to an existing parallel DBMS.

At 120, the data integrator uses the GUI to interact with the user and the user identifies a file within the DFS. That is, the file is not controlled by or located within the DBMS; rather the file is controlled by the DFS. In an embodiment, the file is controlled and located within a HDFS.

According to an embodiment, at 121, the data integrator samples the file and providing sample lines from the file to the user via the GUI along with a file size for the user to identify all columns of the file including the first columns. Here, the user can also identify delimiters within the sampled data for identifying the first columns in the first instance. This may be needed when the file includes data that is unstructured. Other metadata about the file can also be presented to the user here, such as any that is carried by the DFS and available via an API of the DFS to the data integrator.

At 130, the data integrator acquires, via the GUI, and from the user who is interacting with the GUI, first columns to select from the file and a mapping. The mapping provides instructions to map the first columns to data types, which are present within the DBMS. This mapping permits data exported according to the instructions for the first columns to be imported into a dynamically created table within the DBMS for the user to subsequently interact with, analyze, and otherwise use.

In an embodiment, at 131, the data integrator presents a drop-down list within the GUI that shows all relational data types available within the DBMS including the data types selected by the user. The drop-down list can also be searchable within the GUI by the user.

In another instance, at 132, the data integrator permits the user to access features of the GUI to custom define a new data type within the DBMS to include with the data types selected by the user. In other words, the user may dynamically define a new data type for the DBMS to user.

At 140, the data integrator obtains, via the GUI, and from the user filtering conditions for matching data in the first columns of the file. The query conditions for selecting data from the user-identified columns can be made with the filtering conditions.

According to an embodiment, at 141, the data integrator presents a drop-down list within the GUI that shows all filtering conditions available within the DBMS including the filtering conditions selected by the user. It may also be that the GUI allows the list to be user searched.

In another scenario, at 142, the data integrator permits the user to input hints within the GUI that defines record boundaries or column ranges available within the file and used when generating the UDF. This permits the data integrator to optimize the resulting UDF (discussed below) based on the attributes of the data included within the file.

At 150, the data integrator generates a user-defined function (UDF) for selections of the user made via the GUI. The data integrator is a code generator that is menu-driven from the selections made by the user interacting with the GUI.

In an embodiment, at 151, the data integrator assigns a UDF name defined by the user for subsequent recall and execution within the DBMS by the user or other users of the DBMS. The UDF can be referenced by other users within the DBMS or used within automated modules that are implemented within an API of the DBMS using the UDF name.

According to an embodiment, at 160, the data integrator executes the UDF against the DFS and file and returns results for the matching data to a table within the DBMS for further analysis and manipulation by the user within the DBMS, the matching data is mapped to the selected data types using the mapping.

Continuing with the embodiment of 160 and at 161, the data integrator determines whether to execute the UDF on the DBMS or on the DFS. This can be achieved in a number of manners.

For example, at 162, the data integrator determines based on a selection received from the user that indicates specifically where the UDF is to execute. So, the user can execute the UDF on the DFS or on the DBMS.

In another instance of 161 and at 162, the data integrator determines where the UDF is to execute based on dynamically evaluating metrics associated with sizes, loads, and configurations with the UDF and the DBMS. So, dynamic resolution of where to execute the UDF can be achieved by evaluation of metrics for both the DBMS and the DFS.

Figure 2:
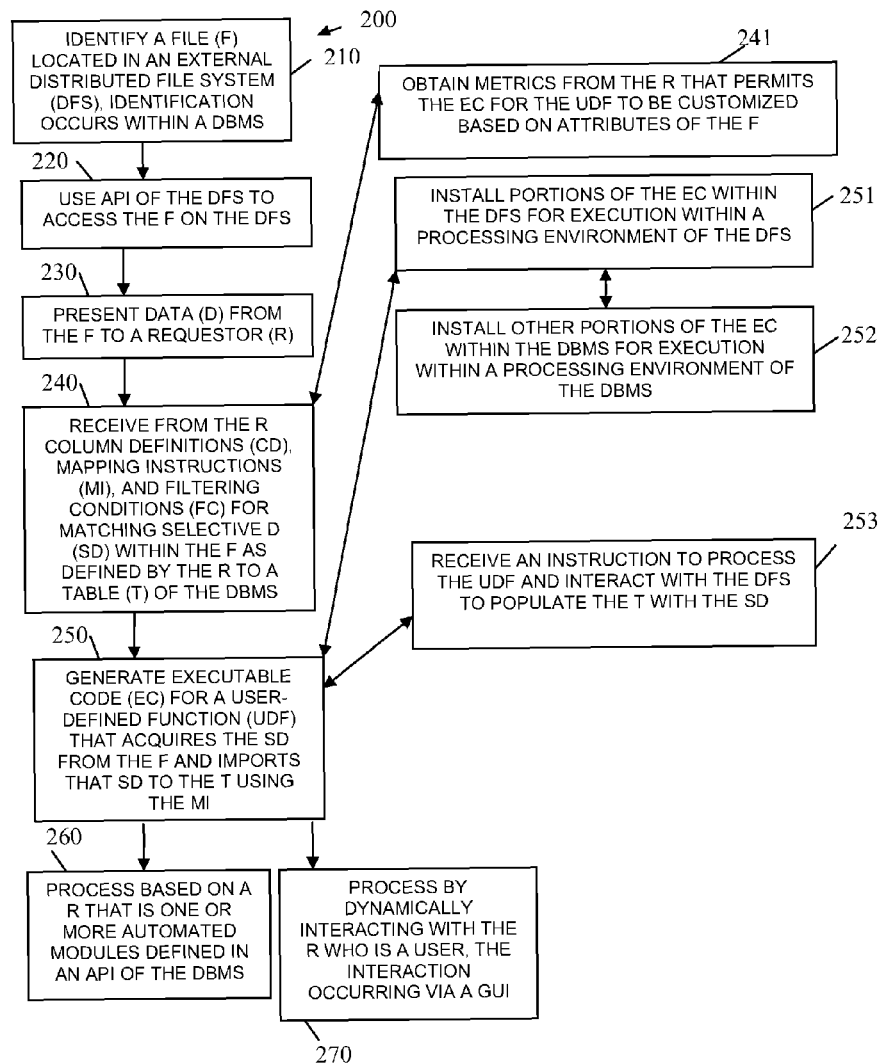
FIG. 2 is a diagram of another method for accessing an external distributed file system file via direction from a parallel DBMS, according to an example embodiment.

FIG. 2 is a diagram of another method 200 for accessing an external distributed file system file via direction from a parallel DBMS, according to an example embodiment. The method 600 (hereinafter "external query builder") is implemented as instructions within a non-transitory computer-readable storage medium that execute on one or more processors, the processors specifically configured to execute the external query builder. Moreover, the external query builder is programmed within a non-transitory computer-readable storage medium. The external query builder is also operational over a network; the network is wired, wireless, or a combination of wired and wireless.

The external query builder presents yet another view of the processing discussed above with respect to the FIG. 1 and the data integrator.

At 210, the external query builder identifies a file located in an external distributed file system (DFS); the identification occurs within a parallel database management system (DBMS). In an embodiment, the DFS is a HDFS having a variety of externally maintained data that is unstructured.

At 220, the external query builder uses an API of the DFS to access the file on the DFS.

At 230, the external query builder presents data from the file to a requestor.

At 240, the external query builder receives from the requestor column definitions, mapping instructions, and filtering conditions for matching selective data within the file as defined by the requestor to a table of the DBMS.

According to an embodiment, at 241, the external query builder obtains metrics from the requestor that permits the executable code for the UDF to be customized based on attributes of the file.

At 250, the external query builder generates executable code for a user-defined function (UDF) that acquires the selective data from the file and imports that selective data to the table using the mapping instructions.

In another case, at 251, the external query builder installs portions of the executable code within the DFS for execution within a processing environment of the DFS.

Continuing with the embodiment of 251 and at 252, the external query builder installs other portions of the executable code within the DBMS for execution within a processing environment of the DBMS.

According to an embodiment, at 253, the external query builder receives an instruction to process the UDF and interacts with the DFS to populate the table with the selective data.

In an embodiment, at 260, the external query builder is processed based on a requestor that is one or more automated modules defined in an API of the DBMS. In other words, the requestor is an automated module defined in the API of the DBMS and interacts with the external query builder.

In another situation, at 270, the external builder is processed based on dynamically interaction with the requestor who is a user; the interaction occurring via a GUI interfaced to the external query builder. This embodiment is similar to the processing discussed above with respect to the FIG. 1.

Figure 3:
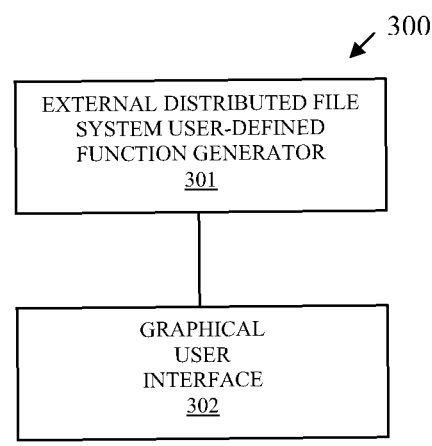
FIG. 3 is a diagram of an external distributed file and user-defined function code generator system, according to an example embodiment.

FIG. 3 is a diagram of an external distributed file and user-defined function code generator system 400, according to an example embodiment. The components of the external distributed file and user-defined function code generator system 400 are implemented as instructions within a non-transitory computer-readable storage medium that execute on one or more processors of a parallel DBMS, the processors specifically configured to execute the external distributed file and user-defined function code generator system 400. Moreover, external distributed file and user-defined function code generator system 400 is programmed within a non-transitory computer-readable storage medium. The external distributed file and user-defined function code generator system 400 is also operational over a network; the network is wired, wireless, or a combination of wired and wireless.

The external distributed file and user-defined function code generator system 400 implements, inter alia, various aspects of the methods 100 and 200 presented above with respect to the FIGS. 1 and 2, respectively.

The external distributed file and user-defined function code generator system 400 includes a DFS UDF generator 301 and a GUI 302. Each of these and their interactions with one another will now be discussed.

The GUI 302 is discussed first for purposes of comprehension and illustration.

The GUI 302 is implemented in a non-transitory computer-readable medium and executes on one or more processors of the DBMS. Various aspects of the GUI 302 were presented and discussed in detail above with reference to the FIGS. 1 and 2.

The GUI 302 is configured to interact with a user of the DBMS and the DFS UDF generator 301. The GUI 302 provides a menu-driven interface to the user for the user to define columns, mapping instructions, and filtering conditions for a file of the DFS. That is, the file is external and is not controlled and does not reside within the processing environment of the DBMS; rather, the file is externally controlled and resides within the DFS. In an embodiment, the file is located and controlled within a HDFS.

The DFS UDF generator 301 resides, is programmed within, and implemented within a non-transitory computer-readable storage medium. The DFS UDF generator 301 is executed on one or more processors of the DBMS. So, the DFS UDF generator 301 is not processed, is not controlled, and does not reside within the DFS.

Moreover, the DFS UDF generator 301 is configured to use the columns, mapping instructions, and the filtering conditions to generate a specific UDF that when executed accesses the file from the DFS and imports selective data matching the filtering conditions for the columns into a table of the DBMS based on the mapping instructions for the selective data to be analyzed and processed within the DBMS. The processing details associated with the DFS UDF generator 301 were presented above with reference to the FIGS. 1 and 2.

According to an embodiment, the DFS UDF generator 301 is also further configured to generate portions of executable code for the specific UDF for execution by the DFS and other portions of the executable code for execution within the DBMS.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by one or more processors, the processors configured to execute the method, comprising the steps of:
    presenting a graphical user interface (GUI) within a parallel database management system (DBMS) to a user;
    using the GUI, the user identifies a file from an external distributed file system (DFS), external to the DBMS;
    acquiring, via the GUI, and from the user first columns to select from the file and a mapping of the first columns to data types present in the DBMS;
    obtaining, via the GUI, and from the user filtering conditions for matching data in the first columns of the file; and
    generating a user-defined function (UDF) for selections of the user made via the GUI and estimating whether the DFS or DBMS is more likely to execute the UDF more quickly and selecting either the DFS or the DBMS for executing the UDF based on the estimating and accounting for a DFS size for the DFS and DBMS size for the DBMS, and wherein the user can provide hints as where to where the UDF is to be executed or the user can require where the UDF is executed.

2. The method of claim 1 further comprising, executing the UDF against the DFS and file and returning results for the matching data to a table within the DBMS for further analysis and manipulation by the user within the DBMS.

3. The method of claim 1, wherein using further includes sampling the file and providing sample lines from the file to the user via the GUI along with a file size for the user to identify all columns of the file including the first columns.

4. The method of claim 1, wherein acquiring further includes presenting a drop-down list within the GUI that shows all relational data types available within the DBMS including the data types selected by the user.

5. The method of claim 1, wherein acquiring further includes permitting the user to use features of the GUI to custom define a new data type within the DBMS to include with the data types selected by the user.

6. The method of claim 1, wherein obtaining further includes presenting a drop-down list within the GUI that shows all filtering conditions available within the DBMS including the filtering conditions selected by the user.

7. The method of claim 1, wherein obtaining further includes permitting the user to input hints within the GUI that defines record boundaries or column ranges available within the file and used when generating the UDF.

8. The method of claim 1, wherein generating further includes assigning a UDF name defined by the user for subsequent recall and execution within the DBMS by the user or other users of the DBMS.

9. A method implemented and programmed within a non-transitory computer-readable storage medium and processed by one or more processors, the processors configured to execute the method, comprising:
    identifying a file located in an external distributed file system (DFS), identification occurs within a parallel database management system (DBMS);
    using an Application Programming Interface (API) of the DFS to access the file on the DFS;
    presenting data from the file to a requestor;
    receiving from the requestor column definitions, mapping instructions, and filtering conditions for matching selective data within the file as defined by the requestor to a table of the DBMS; and
    generating executable code for a user-defined function (UDF) that acquires the selective data from the file and imports that selective data to the table using the mapping instruction and estimating whether the DFS or DBMS is more likely to execute the executable code more quickly and selecting either the DFS or the DBMS for executing the UDF based on the estimating and accounting for a DFS size for the DFS and DBMS size for the DBMS, and wherein the user can provide hints as where to where the UDF is to be executed or the user can require where the UDF is executed.

10. The method of claim 9 further comprising, processing the method based on a requestor that is one or more automated modules defined in an Application Programming Interface of the DBMS.

11. The method of claim 9 further comprising, processing the method by dynamically interacting with the requestor who is the user, the interaction occurring via a graphical user interface (GUI).

12. The method of claim 9, wherein receiving further includes obtaining metrics from the requestor that permits the executable code for the UDF to be customized based on attributes of the file.

13. The method of claim 9, wherein generating further includes receiving an instruction to process the UDF and interacting with the DFS to populate the table with the selective data.

14. A system, comprising:
    a non-transitory computer-readable storage medium including an external distributed file system (DFS) user-defined function (UDF) that execute on one or more processors of a parallel database management system (DBMS); and
    the non-transitory computer-readable storage medium also including a graphical user interface (GUI) that executes on the one or more processors;
    wherein the GUI is configured to interact with a user of the DBMS and the DFS UDF generator, the GUI provides a menu-driven interface to the user for the user to define columns, mapping instructions, and filtering conditions for a file of the DFS, the DFS UDF generator configured to use the columns, mapping instructions, and the filtering conditions to generate a specific UDF that when executed accesses the file from the DFS and imports selective data matching the filtering conditions for the columns into a table of the DBMS based on the mapping instructions for the selective data to be analyzed and processed within the DBMS or the DFS based on estimates as to whether the DBMS or the DFS would execute the specific UDF more quickly and the estimates account for a DFS size for the DFS and DBMS size for the DBMS, and wherein the user can provide hints as where to where the UDF is to be executed or the user can require where the UDF is executed.

15. The system of claim 14, wherein the DFS UDF generator is further configured to generate portions of executable code for the specific UDF for execution by the DFS and other portions of the executable code for execution within the DBMS.

* * * * *